(12) United States Patent
Gavade et al.

(10) Patent No.: US 8,826,344 B1
(45) Date of Patent: Sep. 2, 2014

(54) PREDICTIVE POSITIONING

(71) Applicant: Verizon Patent and Licensing, Inc., Basking Ridge, NJ (US)

(72) Inventors: Sameer Vasant Gavade, Irving, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/834,748

(22) Filed: Mar. 15, 2013

(51) Int. Cl.
  *H04N 7/173* (2011.01)
  *H04N 21/472* (2011.01)
  *H04N 21/6587* (2011.01)
  *H04N 21/2387* (2011.01)

(52) U.S. Cl.
  CPC ..... *H04N 21/47217* (2013.01); *H04N 21/6587* (2013.01); *H04N 21/2387* (2013.01)
  USPC ..................... 725/88; 725/89; 725/94; 725/96

(58) Field of Classification Search
  USPC ......................... 725/88, 89, 93–96
  See application file for complete search history.

(56) References Cited

U.S. PATENT DOCUMENTS

| | | | |
|---|---|---|---|
| 2003/0002578 A1* | 1/2003 | Tsukagoshi et al. | 375/240.01 |
| 2004/0033053 A1* | 2/2004 | Chen et al. | 386/83 |

* cited by examiner

*Primary Examiner* — Jason J Chung
*Assistant Examiner* — Sumaiya A Chowdhury

(57) ABSTRACT

A method, a device, and a non-transitory storage medium to receive a streaming program, calculate a delay time that occurs between an instant in time when a trick play input is received and an instant in time proximate to an onset of executing the trick play input, and calculate a predicted position of the streaming program based on the delay time, the type of trick play input, the speed of the trick play input, and a difference in the streaming program progress resulting from the delay to execute the trick play input.

25 Claims, 18 Drawing Sheets

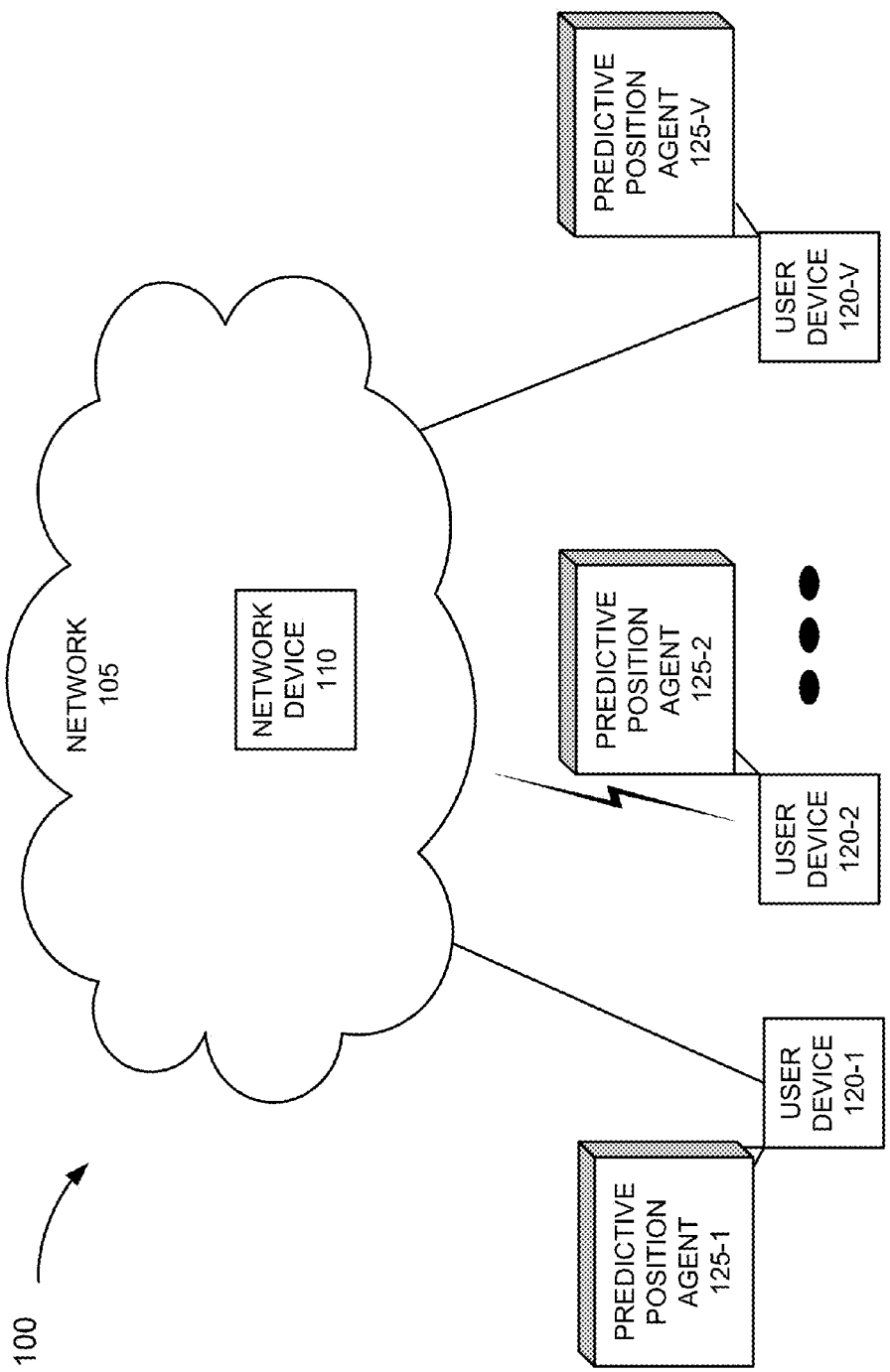

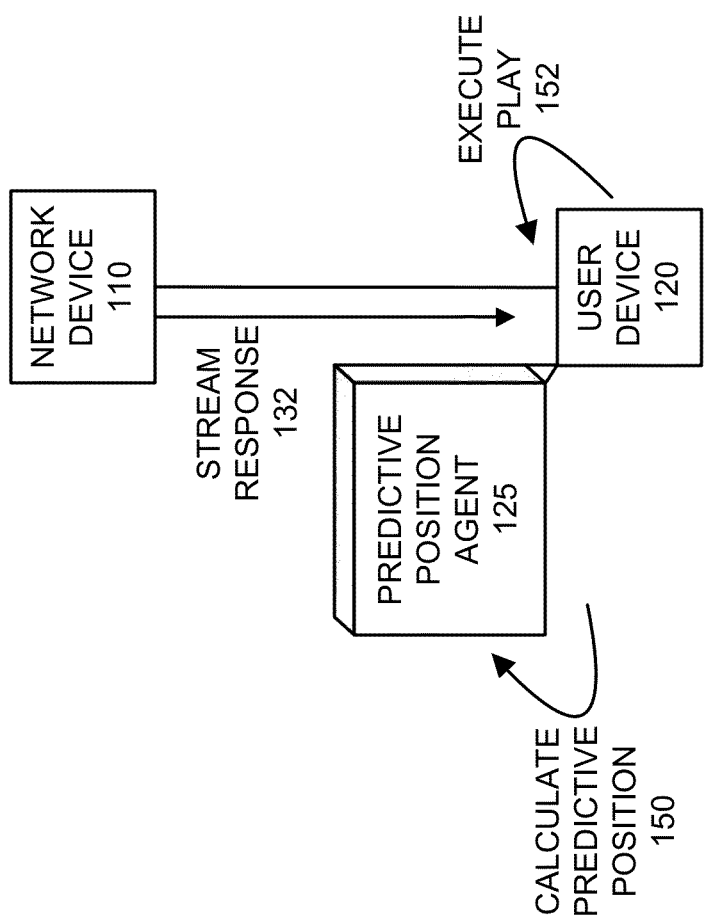

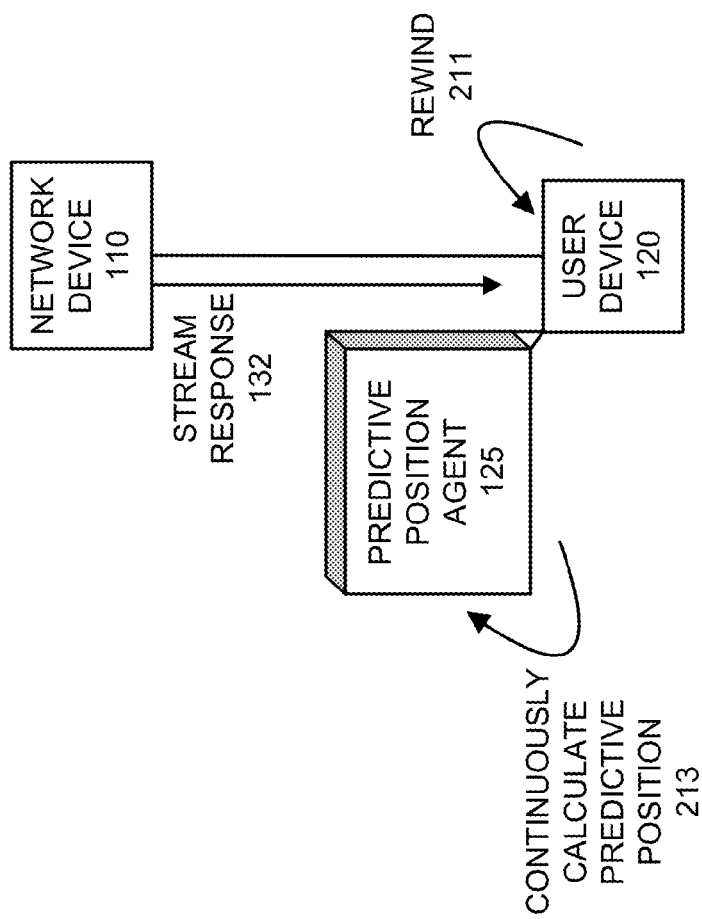

PREDICTIVE POSITIONING

BACKGROUND

User-demand for streamed programs continues to grow given the wide array of devices to which programs may be streamed. For example, a user may enjoy streaming programs via a handheld device, a desktop computer, or a television.

BRIEF DESCRIPTION OF THE DRAWINGS

FIG. 1A is a diagram illustrating an exemplary environment in which an exemplary embodiment of predictive positioning may be implemented;

FIGS. 1B-1F are diagrams illustrating an exemplary predictive positioning process performed in the environment depicted in FIG. 1A;

FIGS. 2A-2C are diagrams illustrating another exemplary predictive positioning process performed in the environment depicted in FIG. 1A;

DETAILED DESCRIPTION OF PREFERRED EMBODIMENTS

Figure 1B:
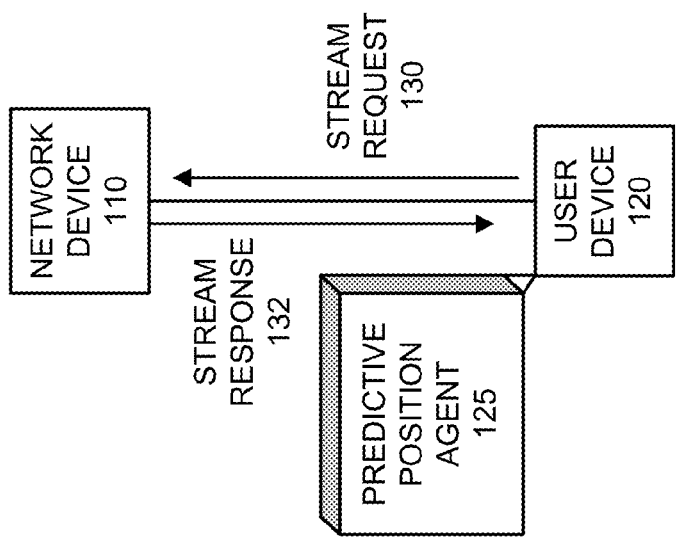

The following detailed description refers to the accompanying drawings. The same reference numbers in different drawings may identify the same or similar elements. Also, the following detailed description does not limit the invention.

The term "streaming program" or "program" as used herein, is intended to include video data, audio data, or a combination of audio data and video data. A streaming program may include television content, Internet content, a pre-recorded program, or a live program. By way of example, a streaming program may be a movie, a television show, video-on-demand (VoD) content, premium channel content, pay-per-view (PPV) content, music, a podcast, Internet radio, or other forms of streaming media (e.g., graphics, video conferencing, slide shows, web tours, or other real-time applications). A streaming program may even include other forms of data (e.g., haptic data, etc.).

There are various forms of streaming, such as, for example, live streaming, on-demand streaming, near-demand streaming (e.g., when the program is not available 24-7, but is provided on-demand with time constraints), true streaming (e.g., when the program takes a few seconds to buffer before playing, but is not stored on a user device), and progressive streaming (sometimes referred to as progressive download), in which the program is stored on a user device before playback. In addition to the different forms of streaming, there are various architectures that may be used for streaming, such as a client-server architecture or a peer-to-peer architecture.

When a user digests a streaming program via a user device, the user may invoke certain trick play operations. The trick play operation may include fast-forward, rewind, play, pause/resume, or instant replay (e.g., replay a segment of the program), or some combination thereof (e.g., fast-forward and then play, etc.). The fast-forward operation and the rewind operation may operate at different speeds (e.g., 1×, 2×, 3×, 4×, 8×, etc.) or as predefined time intervals, such as jumping forward 30 seconds or backward 30 seconds. The user may invoke the trick play operation by pressing a trick play button of a remote control device or inputting a trick play command via a user interface or an input device (e.g., a keyboard, a mouse, etc.).

Unfortunately, there are various delays that occur from the instant in time when the user invokes the trick play operation to the instant in time that the trick play operation is performed. For example, there is a time delay from the instant in time that the user device receives the trick play input (e.g., a pause request) to the instant in time that the user device responds (e.g., pauses the streaming program). Additionally, there is a delay in a multi-device architecture (e.g., a client-server architecture, a peer-to-peer architecture) stemming from any messaging that occurs between the devices in order to respond to the trick play operation and provide the streaming program. For example, assume a scenario in which a server device is playing the program and streaming the playback to a user device. When a user initiates a fast-forward input and a subsequent play input, the user device communicates these trick play inputs to the server device. The server device processes the trick play inputs and provides the streaming program to the user device. As a result, there is a delay based on messaging delays, processing delays, etc.

According to an exemplary embodiment, a user device performs predictive positioning when a trick play operation is invoked. According to an exemplary implementation, the user device includes an agent. The agent may operate at the application level. For example, the agent may be included in a program player or may be a stand-alone component of the user device. Alternatively, the agent may operate at a system level (e.g., operating system level).

According to an exemplary embodiment, the agent calculates a request delay time. The request delay time includes a period of time that transpires from an instant in time when a trick play input is received to an instant in time when the trick play input is to be executed (e.g., an onset time of execution).

According to another exemplary embodiment, the agent calculates a messaging delay time. The messaging delay time includes a period of time that transpires for messaging between a user device and another device (e.g., a server device, a peer device, etc.). For example, a messaging delay time may include a period of time that transpires when the user device transmits a trick play input to a server device that is providing a streaming program to the user device.

According to an exemplary embodiment, the agent continuously monitors, in real-time, a request delay period. According to an exemplary embodiment, the agent stores a default request delay period value and a default messaging delay period value. According to an exemplary embodiment, the agent compares a real-time delay period value to a stored default delay period value. The agent determines whether to use the stored delay period value or use the real-time delay period value based on a difference value, if any, exists. According to an exemplary implementation, if the difference value is within a pre-assigned variance (e.g., ±ten percent of the stored delay period value), the agent uses the stored delay period value to calculate the predictive position. If the difference value is not within a pre-assigned variance, the agent updates the stored delay period value and uses the updated value to calculate the predictive position. In this regard, the stored delay period value is a dynamic value.

According to an exemplary embodiment, the default request delay period values may be obtained during a setup process. By way of example, assume that a user (e.g., a customer, a technician) sets up a set top box, which includes the agent, in the user's home. During the setup process, the user is prompted (e.g., via a user interface displayed on a television connected to the set top box, an LCD of the set top box, etc.) to input trick play inputs. The agent measures the delay period that occurs from the instant in time the input is received to an instant in time proximate to the onset of execution of the trick play input. The agent stores these delay periods as default request delay periods.

According to an exemplary embodiment, the agent calculates a predictive position of the streaming program based on the delay time value(s). Additionally, the agent considers the trick play operation. For example, with respect to a fast-forward operation, the agent considers the direction (i.e., forward) and the speed (e.g., 1×, 2×, 3×, 4×, 8×, etc.). Similarly, with respect to a rewind operation, the agent considers the direction (i.e., reverse) and the speed (e.g., 1×, 2×, 3×, 4×, 8×, etc.). The agent selects a predictive position according to a particular level of granularity (e.g., per/second, per/frame, etc.) associated with the streaming program.

According to various embodiments, the agent may calculate the predictive position in different manners. According to an exemplary embodiment, the agent calculates a predictive position for a trick play input before the user inputs a play request or a resume request. For example, assume that the user device receives a trick play input (FF 1×). The agent timestamps the receipt of the trick play input at t=0. The agent may also map t=0 to the current play position of the streaming program. The trick play input is passed to an application (e.g., a program player) and, at the onset of executing the trick play input or at an appropriate time after receipt of the fast-forward request (i.e., t>0) but before execution of the fast-forward, the agent calculates the delay time. For example, assume the request delay period is one second and the request delay period matches or maps to a stored request delay period. The agent identifies that during the one second delay period, the streaming program has been playing at normal speed (e.g., 24 frames/second). In this regard, the agent calculates that the predictive position to begin the trick play input (FF 1×) is 24 frames ahead of the current position of the streaming program. That is, assume that a (FF 1×) input causes a fast-forward of 48 frames/second. Based on the predictive position, the program player advances 24 frames and begins performing the (FF 1×) operation or includes a 24 frame jump forward (e.g., incrementally or in whole) during the fast-forwarding. A similar process may be performed if the user subsequently inputs a trick play input (FF 2×). That is, assume that a (FF 2×) causes a fast-forward of 96 frames/second. Given the time delay and the difference in frame progression between (FF 1×) and (FF 2×), the agent calculates the appropriate predictive position.

According to an exemplary embodiment, during the fast-forwarding, the agent continuously calculates a predictive position for a play input so as to continuously match future instants of time that a user may input a play request. For example, the agent may use a stored request delay period value to calculate the predictive position for a predicted play input. In view of the delay period associated with receiving a play input to the onset of execution, the fast-forwarding operation may cause the streaming program to advance further in time had a play input been executed upon receipt of the play input. The agent continuously calculates a predictive position (e.g., for each instant in time), during the fast-forwarding, based on the stored request delay period value, the difference in frame progression, and a current streaming program position. The agent may store each predictive position (e.g., a play position), which may be mapped to a predictive play input receipt timestamp (t=0, t=1, etc.) and a current play position. A predictive position would cause the streaming program to backtrack the progress of the streaming program so as to compensate for the delay time and the execution of a play input. When a play input is eventually received, the agent selects the appropriate predictive position for the play input based on the previously calculated predictive positions. For example, the agent selects the appropriate predictive position based on a timestamp indicative of when the play input is received.

According to another exemplary embodiment, the agent calculates a predictive position for a trick play input after the user inputs the play request. For example, consider the previously explained scenario. The user inputs a trick play input (e.g., FF 1×). The agent calculates a predictive position, as previously explained. However, during the fast-forwarding, the agent does not calculate a predictive position for a play input. Rather, the agent waits to receive an actual play input before calculating a predictive position. The agent measures the delay period from the instant in time the play input is received to an instant in time proximate to the onset of execution of the play input. In a manner similar to that previously described, the agent compares a real-time request delay period value to a stored request delay period value and uses one of these values based on a pre-assigned variance. The agent calculates a predictive position based on the delay period, the direction of the fast-forward, the difference in progression, etc., and executes the play input based on the predictive position.

According to yet another embodiment, the agent calculates a predictive position for a trick play input after the user inputs the play request and also takes into account previous trick play input(s). For example, assume the user inputs a series of trick play inputs (e.g., FF 1×, FF 2×, FF 3×, FF 4×, and then play). In contrast to the previously described exemplary embodiments, the agent does not compensate or realign the position of the streaming program in view of the request delays for each fast-forwarding input received. Rather, the agent continuously calculates the predictive position up to the receipt of the play input. The streaming program is repositioned, if needed, to the predictive position taking into account the series of delays, differences in frames/second, direction, etc., associated with the series of trick play inputs.

According to still another exemplary embodiment, an agent on a remote device calculates a predictive position based on a messaging delay. For example, assume a server device streams a movie to a user device. The server device includes the agent. In the middle of the movie, the user decides to fast-forward (FF 2×) and inputs the trick play input into the user device. The user device timestamps the receipt of the trick play input and passes the trick play input to the application layer of the user device. The application layer generates a fast-forward request. The fast-forward request includes the timestamp, which indicates an instant in time that the trick play input was received by the user device. The user device transmits the fast-forward request to the server device. The server device receives the fast-forward request and passes the fast-forward request to the application layer of the server device. Concurrently, the agent calculates the predictive position of the fast-forward based on the period of time that transpires from the timestamp to an instant in time at which the server device is at the onset of executing the fast-forward request or an instant in time after the server device receives the fast-forward request from the user device. Thus, in this embodiment, the predictive position takes into account a messaging delay. The agent considers the progress of the streaming movie, in play mode, during this delay period and calculates a predictive position in a manner previously described. The agent may compare the real-time delay time to a default stored value, as previously described.

Continuing with this exemplary scenario, the server device executes the fast-forward request to cause the movie to fast-forward. For example, the server device may jump (e.g., skip) to the predictive position and then executes the fast-forward from that jumped position or compensates for the progress difference in some other manner, as previously described. The server device transmits the streaming movie in fast-forward mode and the user device receives the streaming movie in fast-forward mode.

Subsequently, the user device receives a play input. The user device timestamps the receipt of the play input and transmits the timestamp in a play request to the server device. In a similar manner, the server device receives the play request. The server device calculates a predictive position based on the timestamp. The user device receives the streaming movie in play mode beginning at the predictive position.

FIG. 1A is a diagram illustrating an exemplary environment 100 in which an exemplary embodiment of predictive positioning may be implemented. As illustrated in FIG. 1A, exemplary environment 100 may include a network 105 that includes a network device 110 and user devices 120-1 through 120-V (referred to collectively as user devices 120, or individually as user device 120) that respectively include predictive position agents 125-1 through 125-V (referred to as collectively as predictive position agents 125, or individually as predictive position agent 125), in which V>2.

The number of devices and configuration in environment 100 is exemplary and provided for simplicity. According to other embodiments, environment 100 may include additional devices, fewer devices, different devices, and/or differently arranged devices than those illustrated in FIG. 1A. For example, according to other embodiments, there may be multiple network devices 110 and/or fewer user devices 120. Additionally, or alternatively, according to other embodiments, environment 100 may not include network 105 and/or network device 110 (e.g., in a peer-to-peer architecture). Environment 100 may include wired (e.g., electrical, optical) and/or wireless connections among the devices illustrated.

Network 105 may include one or multiple networks of one or multiple types. For example, network 105 may include the Internet, a wide area network, a private network, a public network, an intranet, a local area network, a packet-switched network, a wired network (e.g., an optical network, a cable network, etc.), a wireless network (e.g., a mobile network, a cellular network, a non-cellular network, etc.), etc. Network 105 may operate according to various protocols. Typically, the streaming process of programs may use real-time protocols (e.g., Real-time Transport Protocol (RTP), Real-Time Control Protocol (RTCP), Real-Time Streaming Protocol (RTSP), etc.). However, other protocols may be used depending on the implementation. Although not illustrated, network 105 may include various other network devices, such as, one or multiple security devices, routing devices, gateways, access points, etc.

Network device 110 may include a computing device that is capable of streaming a program to another device. For example, network device 110 may correspond to a server device when implementing an embodiment having a client-server architecture. The server device may take the form of a web server, an application server, a virtual server, an audio/video server, a file server, or some other type of network server.

User device 120 may correspond to various types of user devices. User device 120 may be a stationary device, a portable device, a handheld, a palmtop device, or a mobile device. For example, user device 120 may take the form of a computer (e.g., a desktop computer, a laptop computer, a palmtop computer, a tablet computer, a netbook, etc.), a personal digital assistant (PDA), a personal communication system (PCS) terminal, a smartphone, a Web or Internet access device, or some other communication device (e.g., a vehicular communication system). User device 120 may include multiple devices (e.g., a set top box and a television, etc.).

According to an exemplary embodiment, predictive position agent 125 is implemented at an application layer. For example, predictive position agent 125 is included in a program player or is a stand-alone program or application. According to another exemplary embodiment, predictive position agent 125 is implemented at a system level (e.g., operating system of user device 120). According to an exemplary implementation, delay time values may be stored in a file (e.g., a registry file, a hidden data file, or some other type of system file depending on the platform in which user device 120 operates). The file may be loaded during boot-up of user device 120. For example, the file may be loaded during a Basic Input/Output System (BIOS) process or some other initialization process. The agent may include an application programming interface (API) to provide the control of an application (e.g., a program player, etc.) based on the delay time values and calculated predictive position.

FIGS. 1B-1F are diagrams illustrating an exemplary predictive positioning process. According to an exemplary scenario, and referring to FIG. 1B, a user (not illustrated) may wish to view a movie. The user launches a client application and selects a movie to view. User device 120 transmits a stream request 130 to network device 110. Network device 110 receives stream request 130 and streams the selected movie to user device 120 in a stream response 132.

Figure 1C:
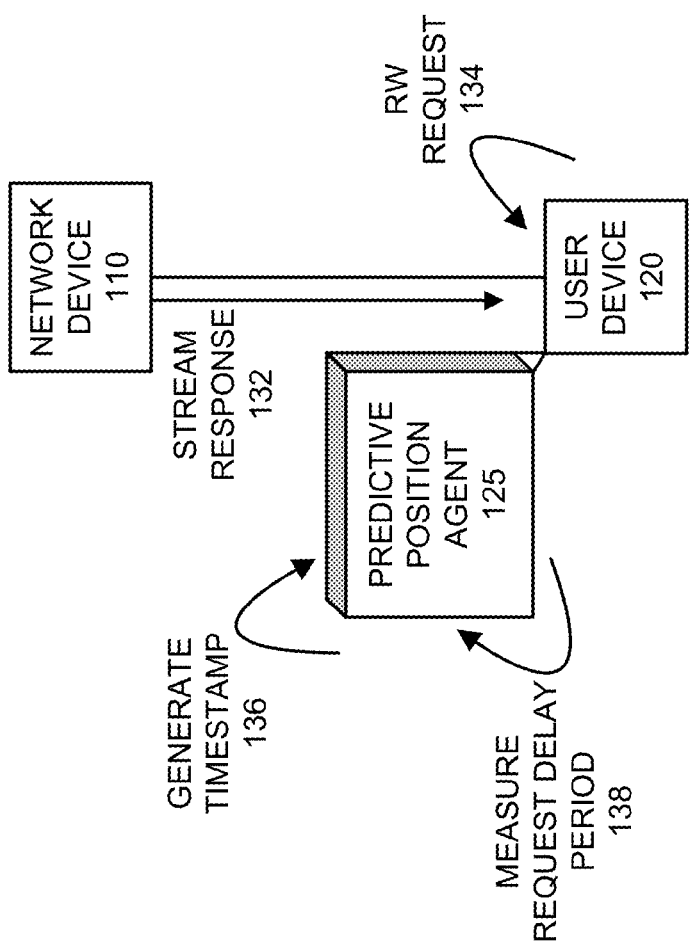

Referring to FIG. 1C, assume that the user inputs a rewind request 134. Predictive position agent 125 generates a timestamp 136 upon receipt of rewind request 134. For example, predictive position agent 125 timestamps the receipt of the trick play input (i.e., rewind request 134) when an input controller of user device 120 (e.g., a keyboard controller, a touchscreen controller, an infrared (IR)/radio frequency (RF) receiver, or a mouse controller) receives the trick play input. Thereafter, the operations that are performed by user device 120 leading up to the onset of execution of rewind request 134 may vary depending on the electronics and configuration of user device 120. For example, user device 120 may generate an interrupt request, which may be assigned a particular priority, an interrupt handler may manage the interrupt request to be serviced (e.g., by an interrupt service routine, thread, etc.), transmit the interrupt to a component of user device 120 (e.g., a central processing unit), inform the application (e.g., a program player, etc.), etc.

Predictive position agent 125 measures a request delay period 138 corresponding to a time period that elapses from the receipt of rewind request 134 to an onset of executing a rewind function or some instant in time between the receipt of rewind request 134 and the onset of execution. Predictive position agent 125 may be competing for processing resources during the request delay period 138 in the absence of a dedicated processing system. The real-time measurement of delay, by predictive position agent 125, may be implemented as a background process. Predictive position agent 125 compares the elapsed time data to a stored default delay time value (e.g., a request delay time value). If a difference exists and the difference is outside of a given variance, predictive position agent 125 uses the measured delay time value to calculate a predictive position and updates the stored default delay time value. Alternatively, as previously described, if the difference is not outside of a given variance, predictive position agent 125 uses the stored default delay time value. According to yet another implementation, predictive position agent 125 may not store a default delay time value and may simply use the measured delay time value.

Figure 1D:
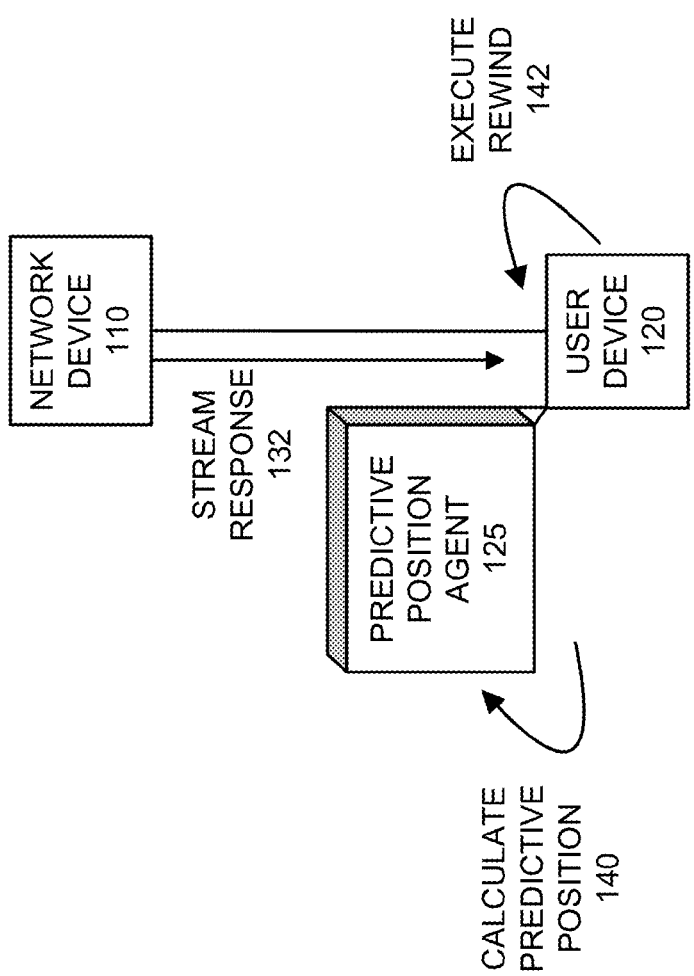

Referring to FIG. 1D, predictive position agent 125 calculates a predictive position 140. According to this exemplary scenario, assume that predictive position agent 125 calculates a predictive position before the user inputs a play input. However, as previously described, according to other exemplary scenarios, predictive position agent 125 may calculate the predictive position at other instants in time, which may be different from, or in addition to, the time explained in this scenario. Predictive position agent 125 calculates the predictive position based on the direction (i.e., rewind), the speed of the rewind, the request delay time, the current position of the streaming program, and the difference in frame progression between play mode and rewind mode. According to this scenario, assume that the previously played position corresponding to a predictive position of the streamed movie is buffered or stored by user device 120. In this case, user device 120 executes the rewind 142. For example, user device 120 (e.g., the client application) jumps backward to the predictive position and begins rewinding (normally) the streamed movie from the predictive position.

Figure 1E:
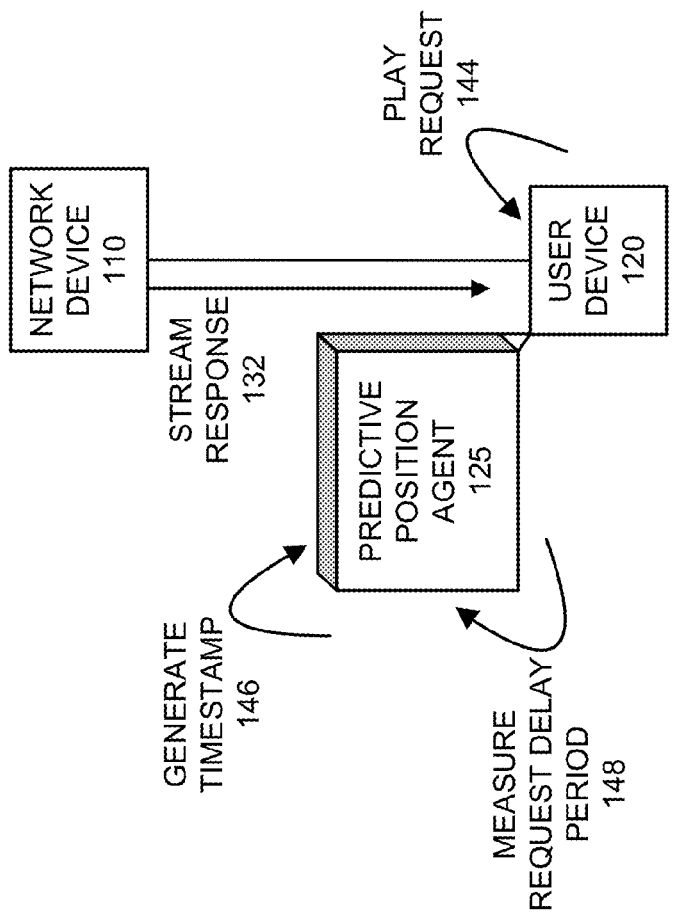

Referring to FIG. 1E, assume that the user inputs a play request 144. Predictive position agent 125 generates a timestamp 146 upon receipt of play request 134. Thereafter, the operations that are performed by user device 120 leading up to the onset of execution of play request 144 may vary depending on the electronics and configuration of user device 120, as previously described. Predictive position agent 125 measures a request delay period 148 corresponding to a time period that elapses from the receipt of play request 144 to an onset of executing play or some instant in time between receipt of play request 114 and the onset of execution. Predictive position agent 125 may be competing for processing resources during the request delay period 148 in the absence of a dedicated processing system. Predictive position agent 125 compares the measured delay time value to a stored delay time value (e.g., a request delay time value). If a difference exists and the difference is outside of a given variance, predictive position agent 125 uses the measured delay time value to calculate a predictive position and updates the stored delay time value. Alternatively, as previously described, if the difference is not outside of a given variance, predictive position agent 125 uses the stored delay time value. According to yet another implementation, predictive position agent 125 may not store a delay time value and may simply use the measured delay time value.

Referring to FIG. 1F, predictive position agent 125 calculates a predictive position 150. Predictive position agent 125 calculates the predictive position based on the request delay time, the current position of the streaming program, and the difference in frame progression between rewind mode and play mode. According to this scenario, assume that the previously played position corresponding to a predictive position of the streamed movie is buffered or stored by user device 120. In this case, user device 120 executes play 152. For example, user device 120 (e.g., the client application) jumps forward to the predictive position and begins playing (normally) the streamed program from the predictive position.

Figure 2A:
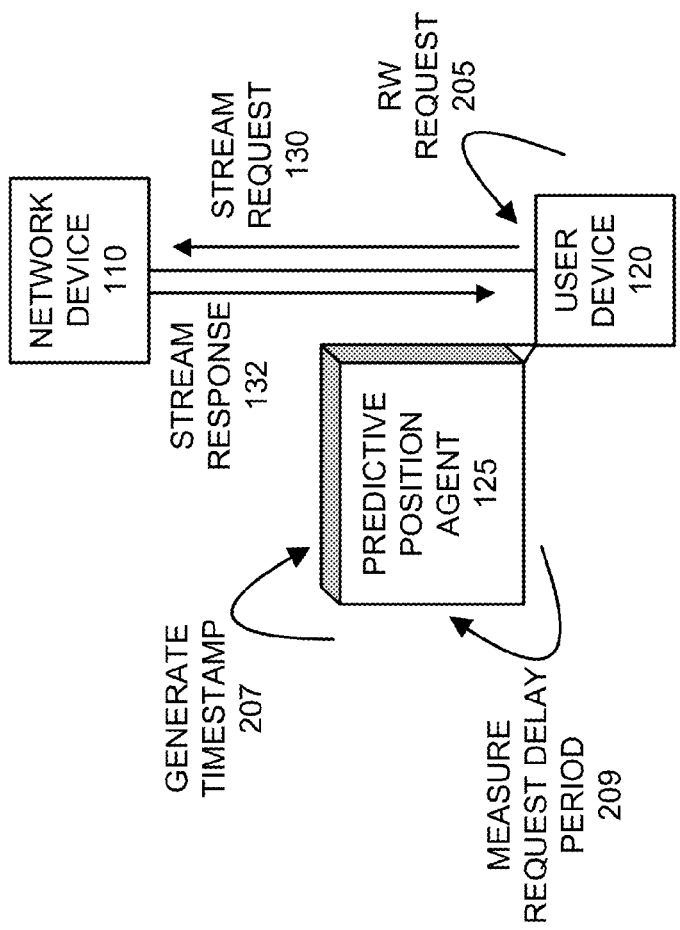
Figure 2C:
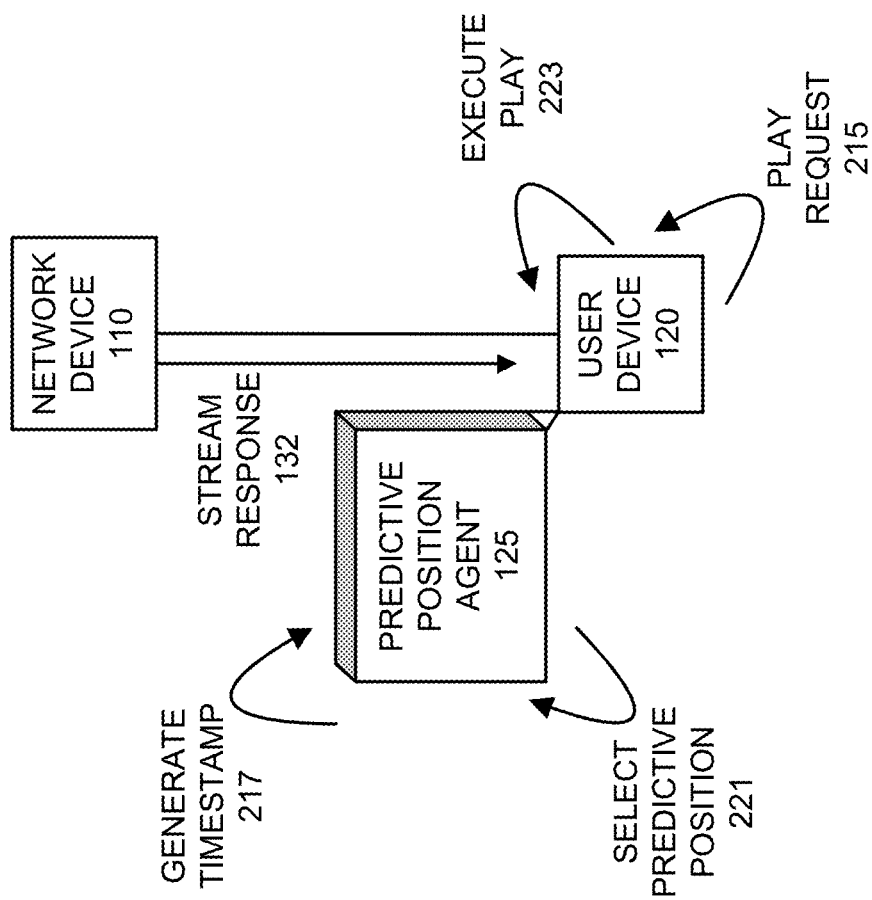

FIGS. 2A-2C are diagrams illustrating an exemplary predictive positioning process. According to this exemplary scenario, predictive position agent 125 continuously calculates a predictive position for a play input when a previous input is a rewind input or a fast-forward input. Referring to FIG. 2A, a user (not illustrated) may wish to view a movie. The user launches a client application and selects a movie to view. User device 120 transmits a stream request 130 to network device 110. Network device 110 receives stream request 130 and streams the selected movie to user device 120 in a stream response 132.

During the movie, assume that the user inputs a rewind request 205. In a manner previously described, predictive position agent 125 generates a timestamp 207 upon receipt of rewind request 205. Thereafter, the operations that are performed by user device 120 leading up to the onset of execution of rewind request 134 may vary depending on the electronics and configuration of user device 120. Predictive position agent 125 measures a request delay period 209 corresponding to a time period that elapses from the receipt of rewind request 205 to an onset of executing a rewind or some instant in time between the receipt of rewind request 205 and the onset.

Predictive position agent 125 compares the elapsed time data to a stored delay time value (e.g., a request delay time value). If a difference exists and the difference is outside of a given variance, predictive position agent 125 uses the measured delay time value. Alternatively, as previously described, if the difference is not outside of a given variance, predictive position agent 125 uses the stored delay time value. According to yet another implementation, predictive position agent 125 may not store a delay time value and may simply use the measured delay time value.

Referring to FIG. 2B, assume that a rewind 211 is executed. For example, assume that the movie is rewound normally without any position compensation. However, as previously described, predictive position agent 125 has selected a delay time value for the rewind request. Predictive position agent 125 continuously calculates a predictive position 213 for a play input so as to continuously match instants of time that the user may input a play request. For example, predictive position agent 125 uses a stored request delay period value. Predictive position agent 125 calculates a predictive position based on the stored delay time for responding to a play input request and the delay time associated with rewind request. Thus, the difference in position of the movie caused by the delay associated with executing the rewind and the difference in position of the movie caused by the delay associated with executing play are considered. Predictive position agent 125 may store each predictive position, which may be mapped to a predictive play input receipt timestamp.

Referring to FIG. 2C, assume that a play request 215 is received. Predictive position agent 125 generates a timestamp 217 indicating an instant in time that play request 215 is received. Predictive position agent 125 uses the timestamp as a key to determine which of the previously calculated predictive positions are to be used. Predictive position agent 125 selects the appropriate predictive position 221 and executes play 223 to cause the movie to play beginning at the predictive position.

Figure 3A:
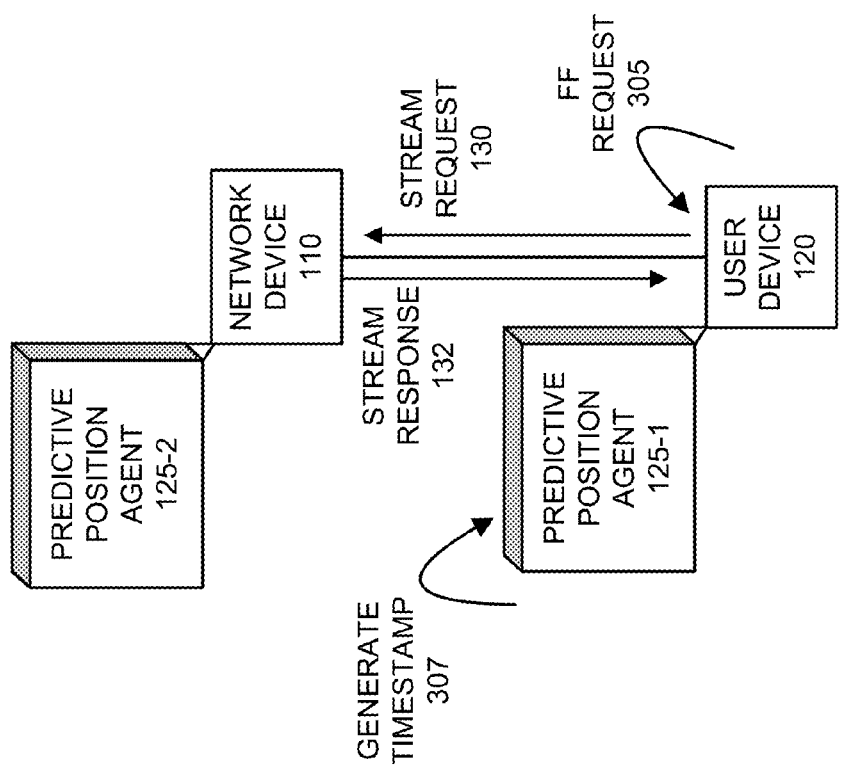
FIGS. 3A-3D are diagrams illustrating yet another exemplary predictive positioning process performed in the environment depicted in FIG. 1A.

FIGS. 3A-3D are diagrams illustrating another exemplary predictive positioning process. According to this exemplary scenario, predictive position agent 125 calculates a predictive position based on a messaging delay. Referring to FIG. 3A, a user (not illustrated) may wish to view a television program. The user launches a client application and selects a television program to view. User device 120 transmits a stream request 130 to network device 110. Network device 110 receives stream request 130 and streams the selected television program to user device 120 in a stream response 132.

Figure 3B:
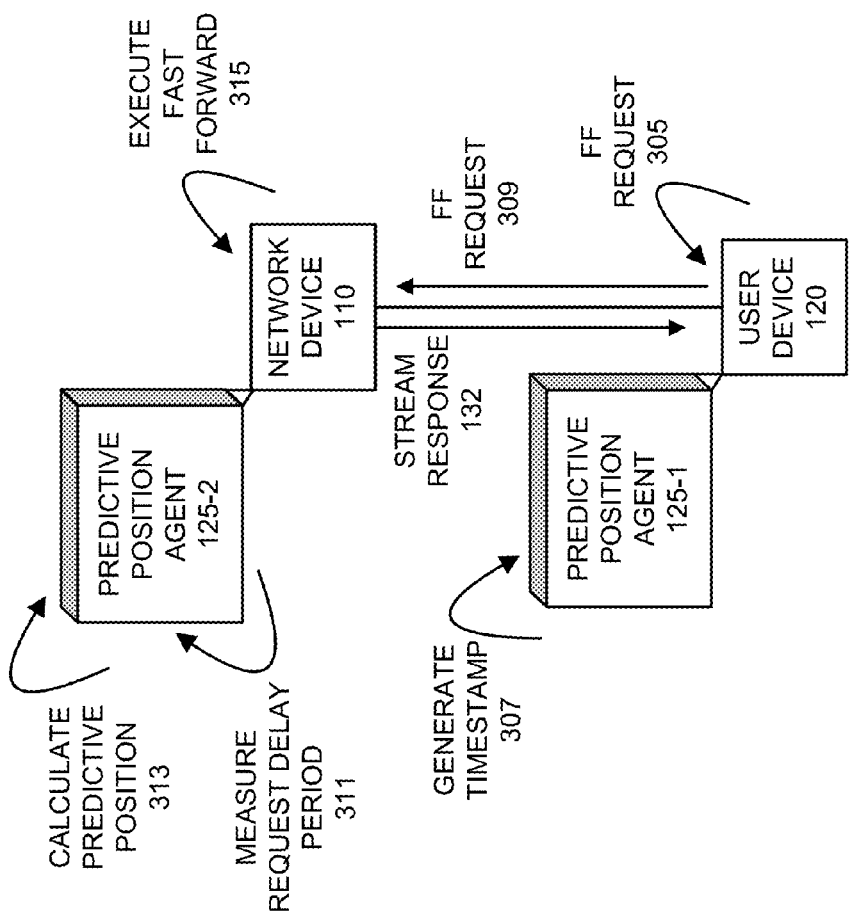

During the television program, assume that the user inputs a fast-forward request 305. In a manner previously described, predictive position agent 125-1 of user device 120 generates a timestamp 307 upon receipt of fast-forward request 305. Thereafter, fast-forward request 305 is passed to, for example, an application (e.g., the client application) and/or a communication interface of user device 120. Referring to FIG. 3B, a fast-forward request 309 is generated. Fast-forward request 309 includes the timestamp. User device 120 transmits fast-forward request 309 to network device 110.

Network device 110 receives fast-forward request 309. Network device 110 passes the fast-forward request 309 to an application playing/streaming the television program to user device 120. Concurrently, predictive position agent 125-2 measures a request delay period 311 corresponding to a time period that elapses from the receipt of fast-forward request 305 (e.g., timestamp 307) to an onset of executing a fast-forward, by network device 110, or some instant in time between the receipt of fast-forward request 305 and the onset of execution. Predictive position agent 125-2 compares the measured request delay period value to a stored delay value, and depending on a difference between the two delay values, predictive position agent 125-2 may use the measured or the stored delay value, as previously described. Predictive position agent 125-2 calculates a predictive position 313 based on previously explained parameters (e.g., the delay, play mode versus fast-forward mode, etc.). Network device 110 executes fast-forward 315 based on the predictive position. For example, network device 110 may jump to the predictive position and then begin fast-forwarding from the predictive position.

Figure 3C:
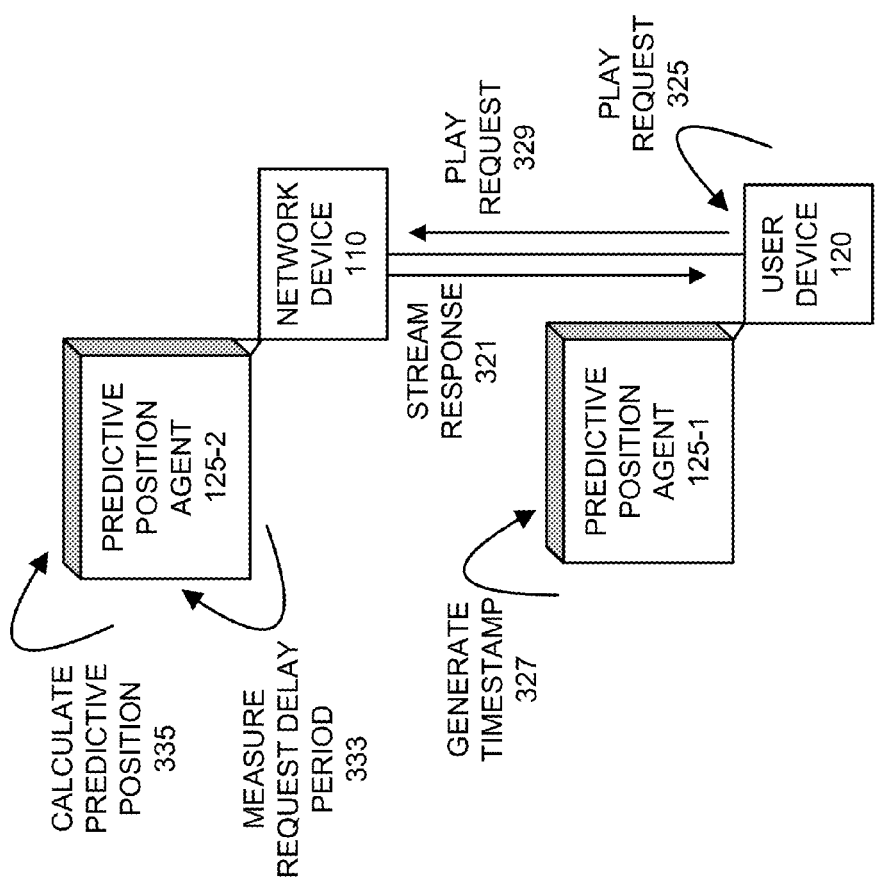
Figure 3D:
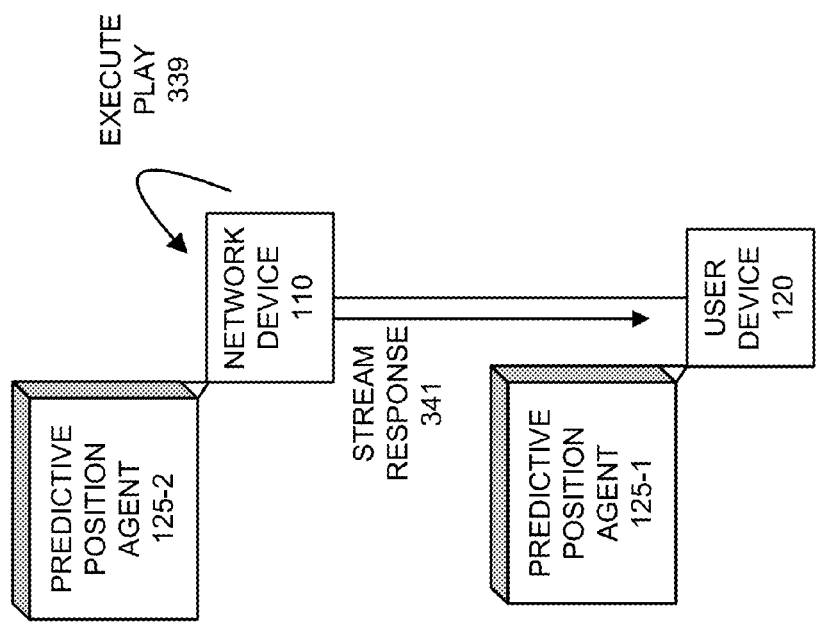

Referring to FIG. 3C, user device 120 receives a stream response 321 that includes the streaming television program in fast-forward mode. Subsequently, the user inputs a play request 325. Predictive position agent 125-1 generates a timestamp 327. In a manner similar to that previously described, user device 120 transmits a play request 329 to network device 110. Predictive position agent 125-2 measures a request delay period 333 corresponding to a time period that elapses from the receipt of play request 325 (e.g., timestamp 327) to an onset of executing play, by network device 110, or some instant in time between the receipt of play request 325 and the onset of execution. Predictive position agent 125-2 calculates a predictive position 335 based on previously explained parameters (e.g., the delay, play mode versus fast-forward mode, etc.). Referring to FIG. 3D, network device 110 executes play 339 based on the predictive position. For example, network device 110 may jump to the predictive position and then begin playing the television program from the predictive position. User device 120 receives a stream response 341 that includes the streaming television program in play mode.

The scenarios described in reference to FIGS. 1A-3D are exemplary. Various modifications of calculating a predictive position may be implemented depending on the user's inputs and sequence thereof.

Figure 4:
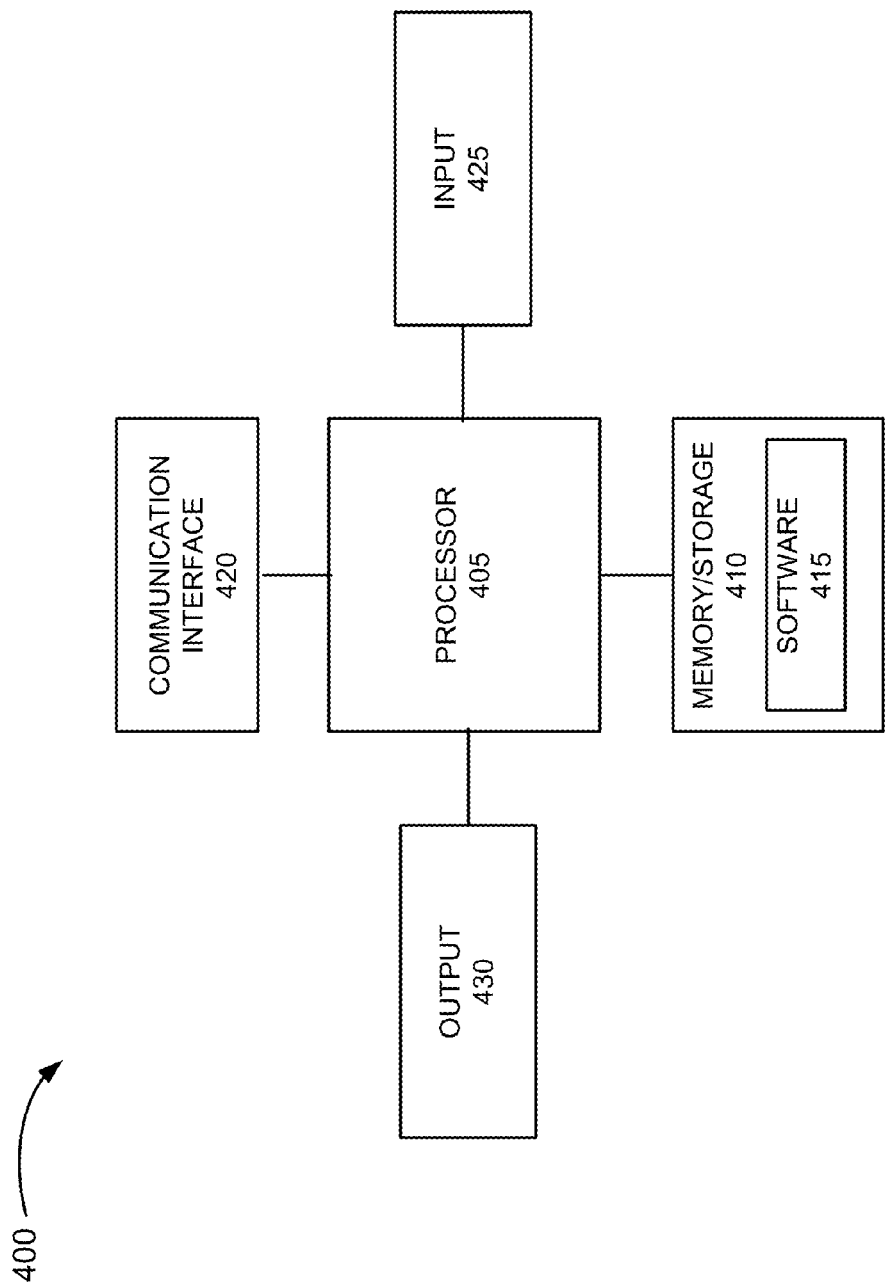
FIG. 4 is a diagram illustrating exemplary components of a device that may correspond to one or more devices in the environment depicted in FIG. 1A.

FIG. 4 is a diagram illustrating exemplary components of a device 400 that may correspond to one or more of the devices in environment 100. For example, device 400 may correspond to components included in user device 120 or other device(s) that may be used in a streaming process. As illustrated, device 400 includes a processor 405, a memory/storage 410 that stores software 415, a communication interface 420, an input 425, and an output 430. According to other implementations, device 400 may include fewer components, additional components, different components, and/or a different arrangement of components than those illustrated in FIG. 4 and described herein.

Processor 405 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation, or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., another device, a network, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 410 may include a hard disk (e.g., a magnetic disk, an optical disk, a magneto-optic disk, a solid state disk, etc.) and a corresponding drive. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 410 may store data, software, and/or instructions related to the operation of device 400

Software 415 includes an application or a program that provides a function and/or a process. Software 415 may include firmware. For example, with reference to user device 120, software 415 may include an application that, when executed by processor 405, provides the functions of predictive position agent 125, as described herein.

Communication interface 420 permits device 400 to communicate with other devices, networks, systems and/or the like. Communication interface 420 includes one or multiple wireless interface(s) and/or wired interface(s). For example, communication interface 420 may include one or multiple transmitter(s) and receiver(s), or transceiver(s).

Input 425 provides an input into device 400. For example, input 425 may include a keyboard, a keypad, a touchscreen, a touch pad, a touchless screen, a mouse, an input port, a button, a switch, a microphone, a knob, and/or some other type of input.

Output 430 provides an output from device 400. For example, output 430 may include a display, a speaker, a light (e.g., light emitting diode(s), etc.), an output port, a vibratory mechanism, and/or some other type of output.

Device 400 may perform a function or a process in response to processor 405 executing software instructions stored by memory/storage 410. For example, the software instructions may be read into memory/storage 410 from another memory/storage 410 or read from another device via communication interface 420. The software instructions stored in memory/storage 410 may cause processor 405 to perform processes described herein. Alternatively, according to another implementation, device 400 may perform a process or a function based on the execution of hardware (e.g., processor 405, etc.).

Figure 5A:
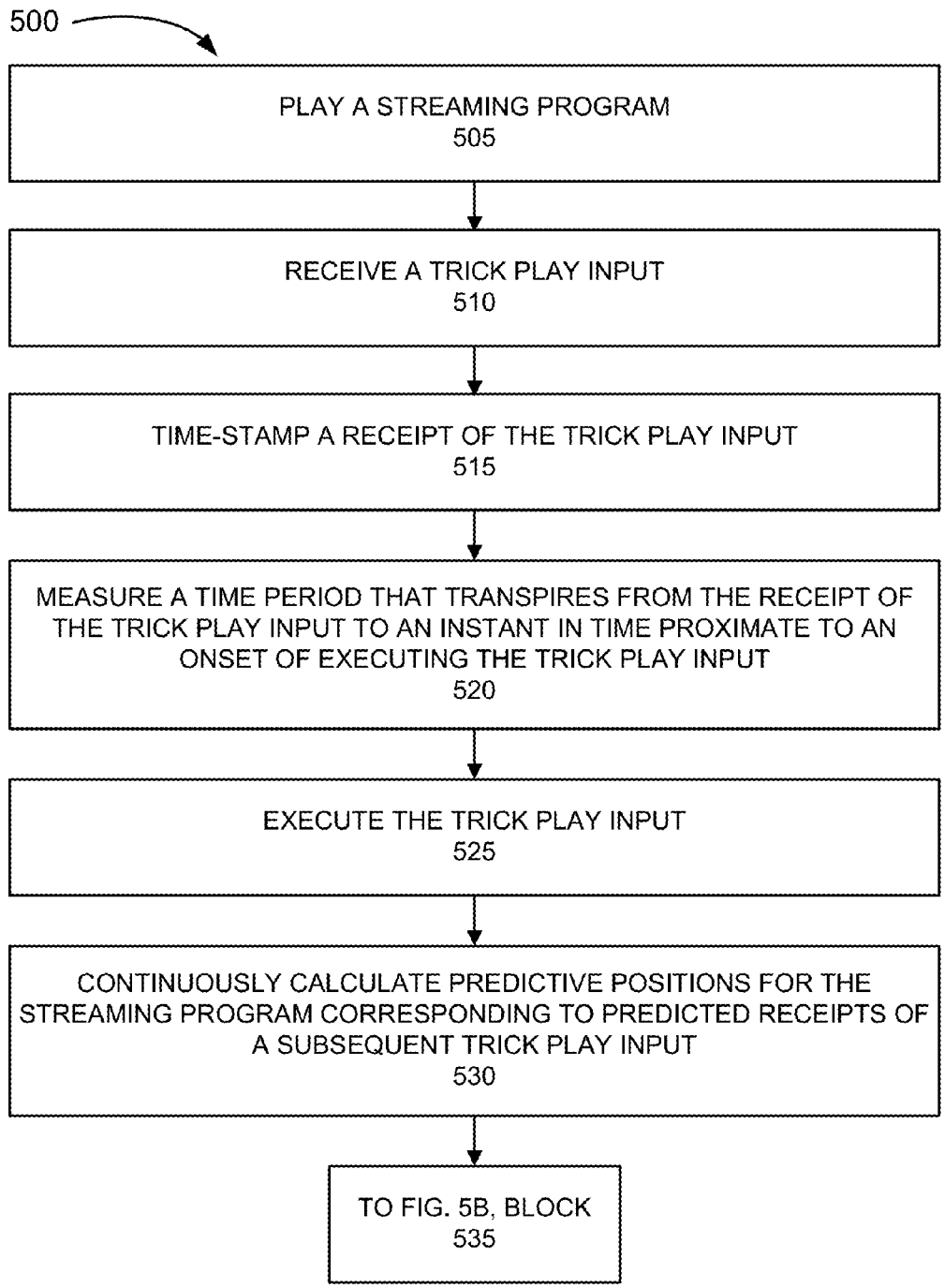
FIGS. 5A and 5B is a flow diagram illustrating an exemplary predictive positioning process.
Figure 5B:
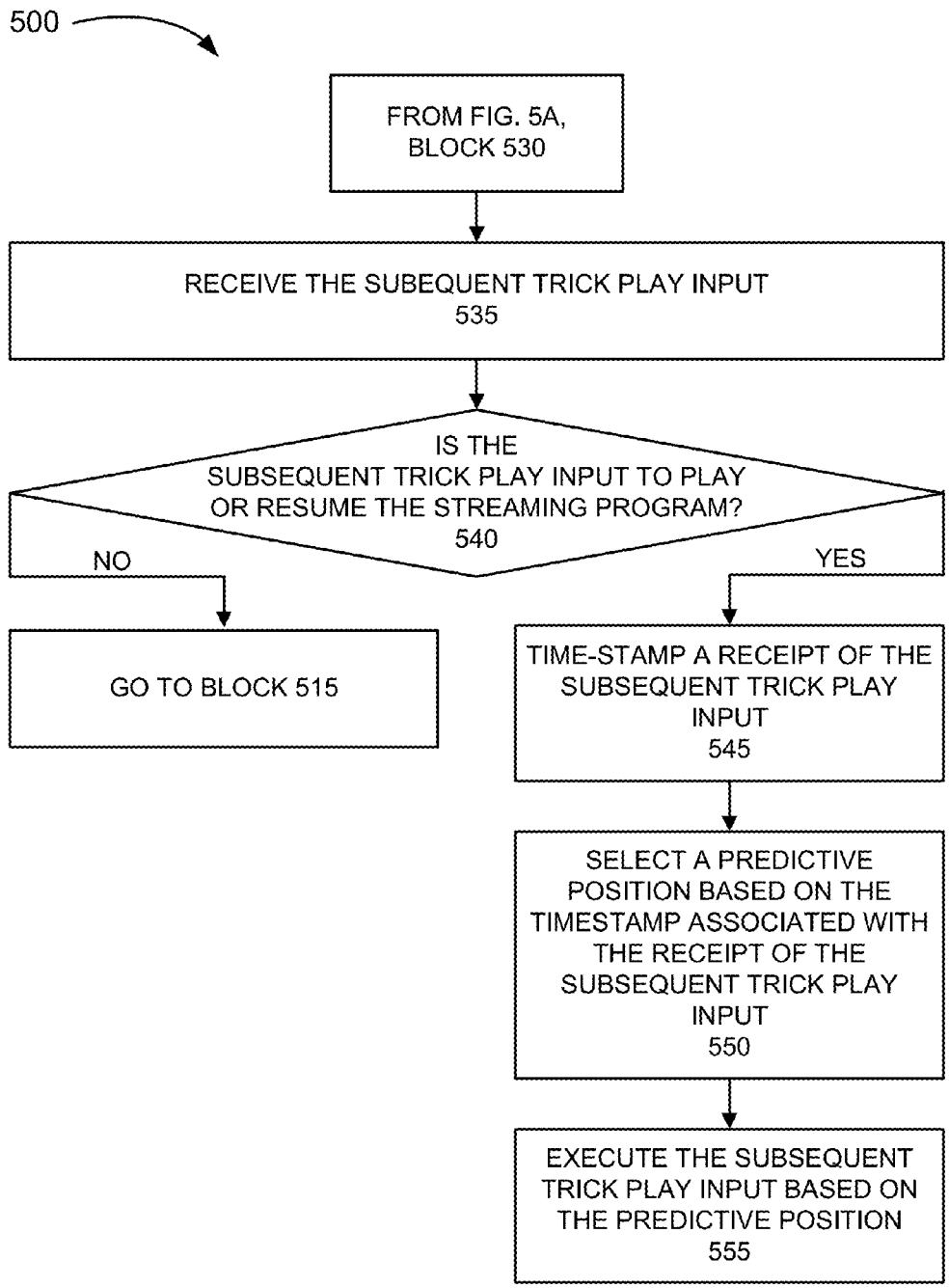

FIGS. 5A and 5B is a flow diagram illustrating an exemplary predictive positioning process 500. Process 500 is directed to the embodiment, previously described above with respect to FIGS. 2A-2C, in which predictive position agent 125 continuously calculates a predictive position based on predicted time receipts of a subsequent trick play input (e.g., a play input or a resume input). According to an exemplary embodiment, one or more operations of process 500 are performed by predictive position agent 125. For example, the functionality of predictive position agent 125 may be implemented as processor 405 executing software 415.

Referring to FIG. 5A, in block 505, a streaming program is played. For example, user device 120 receives a streaming program from network device 110.

In block 510, a trick play input is received. For example, a user of user device 120 inputs a trick play input into user device 120. The trick play input may be a fast-forward request, a rewind request, or a pause request to cause the streaming program to fast-forward, rewind, or pause. The fast-forward request and the rewind request may indicate a speed (e.g., FF 1×, RW 2×, etc.), as previously described.

In block 515, a receipt of the trick play input is time-stamped. For example, predictive position agent 125 of user device 120 time-stamps the receipt of the trick play input.

In block 520, a time period that transpires from the receipt of the trick play input to an instant in time proximate to an onset of executing the trick play input is measured. For example, as previously described, predictive position agent 125 measures the time period that transpires from the instant in time indicated by the timestamp to an instant in time close to the onset of executing the trick play input.

According to an exemplary implementation, predictive position agent 125 compares the measured request delay value to a default request delay value. As previously described, predictive position agent 125 determines if a difference value falls outside of a variance (e.g., ±X-percentage of the default request delay value). If the difference value is within the variance, predictive position agent 125 uses the default request delay value to calculate a predictive position. If the difference value is not within the variance, predictive position agent 125 updates the default request delay value and uses the measured request delay value to calculate a predictive position.

In block 525, the trick play input is executed. For example, user device 120 executes the trick play input. According to an exemplary implementation, user device 120 executes the trick play input without any position compensation of the streaming program stemming from the request delay time period. That is, predictive position agent 125 does not calculate a predictive position in relation to the default or measured request delay value. Thus, the trick play input is executed normally without a jump (e.g., forward, backward) or other operation to position (e.g., time-wise) the streaming program. According to another exemplary implementation, predictive position agent 125 may compensate for the request delay in relation to the trick play input. For example, predictive position agent 125 calculates a predictive position based on the default or measured request delay value, the difference in streaming program progress or regress that occurs resulting from the delay, the direction of the trick play input, the speed (if any) associated with the trick play input, and a current position mapped to the timestamp. For the sake of description, assume that user device 120 executes the trick play input without any position compensation.

In block 530, predictive positions for the streaming program corresponding to predicted receipts of a subsequent trick play input are continuously calculated. For example, predictive position agent 125 continuously calculates a predictive position for a play input or a resume input so as to continuously match instants of time that the user may input the play input or the resume input. According to an exemplary implementation, predictive position agent 125 calculates a predictive position based on the default or measured request delay value associated with the trick play input of block 510, as well as the other parameters (e.g., direction of the trick play input, speed (if any), etc.) previously described in block 525. Additionally, predictive position agent 125 uses a default stored request delay value indicating a time period that transpires from an instant in time that the play input or the resume input to an instant in time proximate to an onset of executing the play or the resume, as well as the other parameters (e.g., difference in streaming program process, etc.).

According to an exemplary implementation, predictive position agent 125 stores a series of calculated predictive positions that are mapped to positions of the streaming program or a current time (e.g., a system time of user device 120).

Referring to FIG. 5B, in block 535, a subsequent trick play input is received. For example, the user of user device 120 inputs a subsequent trick play input into user device 120. The subsequent trick play input may be a fast-forward request, a rewind request, a play request, or a resume request, to cause the streaming program to fast-forward, rewind, play, or resume. The fast-forward request and the rewind request may indicate a speed (e.g., FF 1×, RW 2×, etc.), as previously described.

In block 540, it is determined whether the subsequent trick play input is to play or resume the streaming program. For example, user device 120 (e.g., a component of user device 120 other than predictive position agent 125) or predictive position agent 125 determines whether the subsequent trick play input is a play request or a resume request.

If it is determined that the subsequent trick play input is not to play or to resume the streaming program (block 540—NO), then process 500 continues to block 515 of FIG. 5A. For example, the subsequent trick play input may be a fast-forward request or a rewind request. According to such a scenario, when predictive position agent 125 continuously calculates predictive positions, in block 530, the calculation will consider the delay time, etc., associated with subsequent trick play input. Thus, depending on how many and the type of trick play input(s) that are received, predictive position agent 125 considers the delay time(s), etc., with respect to each trick play input so as to accurately calculate predictive positions, in block 530.

If it is determined that the subsequent trick play input is to play or resume the streaming program (block 540—YES), then a receipt of the subsequent trick play input is time-stamped (block 545). For example, predictive position agent 125 of user device 120 time-stamps the receipt of the subsequent trick play input In block 550, a predictive position based on the timestamp associated with the receipt of the subsequent trick play input is selected. For example, predictive position agent 125 selects a predictive position previously calculated. According to an exemplary implementation, predictive position agent 125 selects the predictive position based on the timestamp.

In block 555, the subsequent trick play input is executed based on the predictive position. For example, user device 120 uses predictive position data to cause the streaming program to being to play or resume at the predictive position. For the sake of description, assume that user device 120 stores or has buffered that portion of the streaming program that corresponds to the predictive position. According to other scenarios, user device 120 may need to request that portion of the streaming program corresponding to the predictive position when that portion is not readily available to user device 120.

Although FIGS. 5A and 5B illustrates an exemplary process 500, according to other implementations, process 500 may include additional operations, fewer operations, and/or different operations than those illustrated in FIGS. 5A and 5B, and described herein.

Figure 6A:
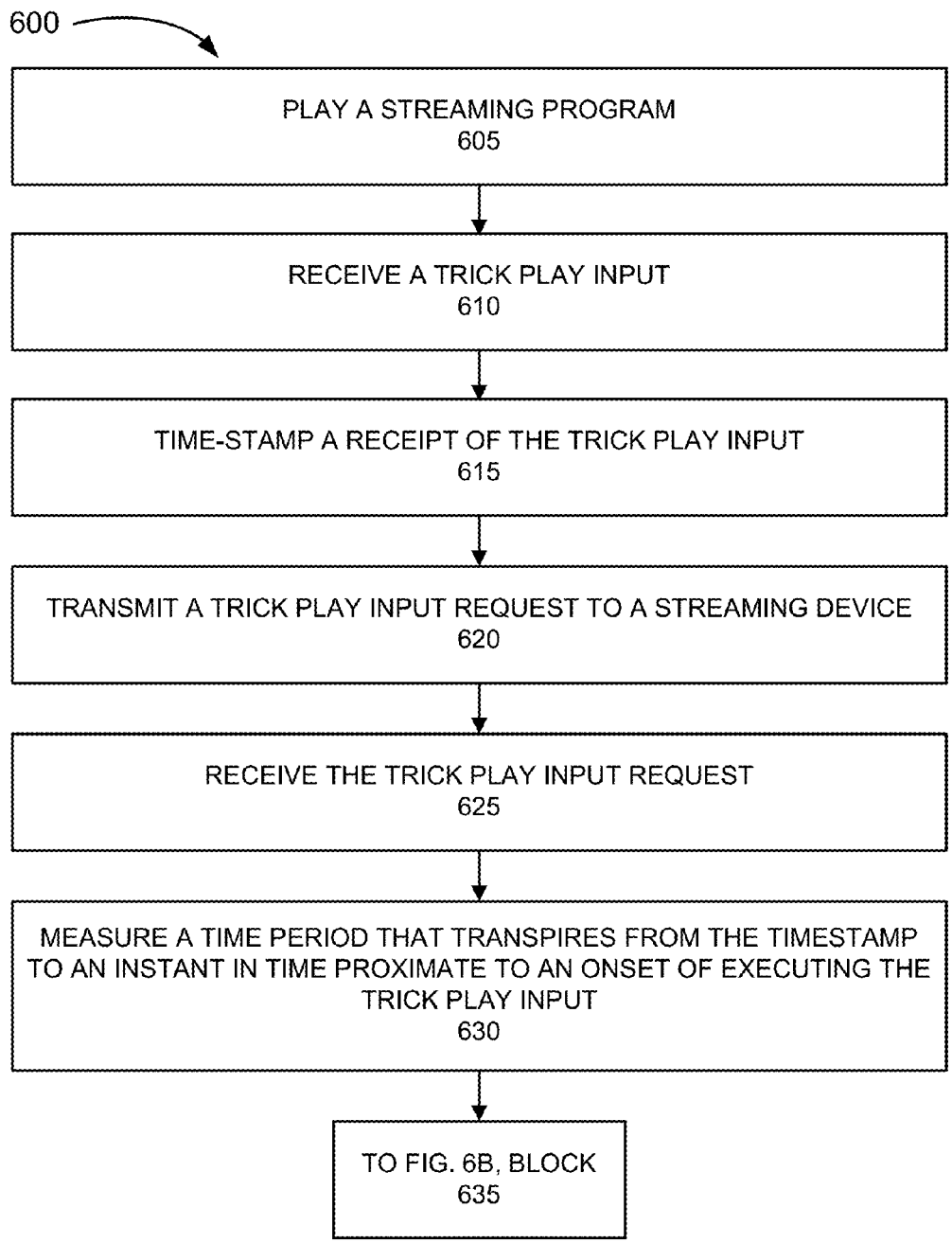
FIGS. 6A and 6B is a flow diagram illustrating another exemplary predictive positioning process.
Figure 6B:
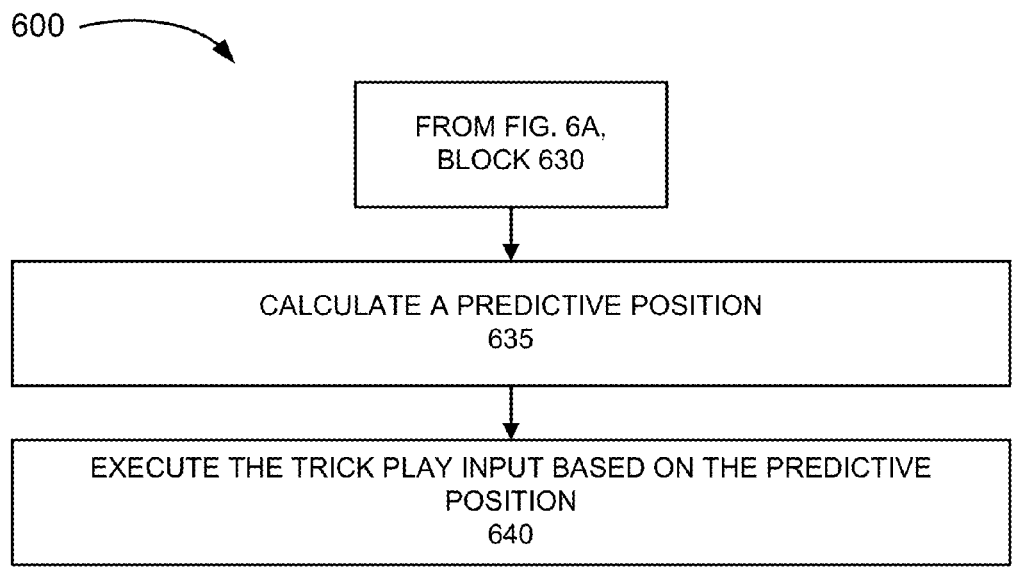

FIGS. 6A and 6B is a flow diagram illustrating another exemplary predictive positioning process 600. Process 600 is directed to the embodiment, such as previously described with respect to FIGS. 3A-3D, in which predictive position agent 125 calculates a predictive position based on a messaging delay. According to an exemplary embodiment, one or more operations of process 600 are performed by predictive position agent 125. For example, the functionality of predictive position agent 125 may be implemented as processor 405 executing software 415.

Referring to FIG. 6A, in block 605, a streaming program is played. For example, user device 120 receives a streaming program from network device 110.

In block 610, a trick play input is received. For example, a user of user device 120 inputs a trick play input into user device 120. The trick play input may be a fast-forward request, a rewind request, or a pause request to cause the streaming program to fast-forward, rewind, or pause. The fast-forward request and the rewind request may indicate a speed (e.g., FF 1×, RW 2×, etc.), as previously described.

In block 615, a receipt of the trick play input is time-stamped. For example, predictive position agent 125 of user device 120 time-stamps the receipt of the trick play input.

In block 620, a trick play input request is transmitted to a streaming device. For example, user device 120 transmits a trick play input request to network device 110. The trick play input request includes the timestamp.

In block 625, the trick play input request is received by the streaming device. For example, network device 110 receives the trick play input request.

In block 630, a time period that transpires from the timestamp to an instant in time proximate to an onset of executing the trick play input is measured. For example, as previously described, predictive position agent 125 of network device 110 measures the time period that transpires from the instant in time indicated by the timestamp to an instant in time close to the onset of executing the trick play input.

Referring to FIG. 6B, in block 635, a predictive position is calculated. For example, predictive position agent 125 of network device 110 calculates a predictive position based on a request delay period. For example, as previously described, predictive position agent 125 may use a measured request delay value or a default request delay value (stored by network device 110) depending on a degree of variance between the values, to calculate the predictive position. Additionally, predictive position agent 125 uses direction of the trick play, speed (if any), difference in streaming program process, etc., as previously described to calculate the predictive position.

In block 640, the trick play input is executed based on the predictive position. For example, network device 110 uses the predictive position data to execute the trick play input.

Although FIGS. 6A and 6B illustrates an exemplary process 600, according to other implementations, process 600 may include additional operations, fewer operations, and/or different operations than those illustrated in FIGS. 6A and 6B, and described herein.

According to an exemplary embodiment, predictive position agent 125 uses a formula to calculate the predictive position. For example, the formula may be implemented as follows:

FFWD=1
RWD=1
PAUSE=0
KEY-D=key delay
NET-D=Network delay
Trick play direction=FFWD/RWD/PAUSE
TPS=Trick play speed (2/4/8/16, etc.)*FPS (frames per second)
Pn=predictive position
P(n−1)=current position $$Pn = P(n-1) - 1*(\text{KEY-}D * \text{Trick play direction} * TPS) - (\text{NET-}D) \quad (1)$$

EXAMPLE

KEY-D=1 second
Trick play direction=FFWD
TPS=2*30 FPS=60 FPS
P(n−1)=1860$^{th}$ frame
Pn=1860−1(1*1*60)−(0)
Pn=1860−60
Pn=1800

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 5A, 5B, 6A, and 6B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 405, etc.), or a combination of hardware and software (e.g., software 415). The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method comprising:
   receiving, by a user device, a streaming program;
   receiving, by the user device, a trick play input, wherein the trick play input includes one of a fast-forward input, a rewind input, or a pause input, during a streaming of the streaming program;
   time-stamping, by the user device, a receipt of the trick play input;
   measuring, by the user device, a time period that transpires from the receipt of the trick play input to an instant in time proximate to an onset of executing the trick play input;
   generating, by the user device, a request delay value indicative of the time period based on the measuring;
   executing, by the user device, the trick play input;
   continuously calculating, by the user device, predictive positions for the streaming program that correspond to predicted receipts of a subsequent trick play input;
   receiving, by the user device, the subsequent trick play input;
   determining, by the user device, whether the subsequent trick play input includes one of a play input or resume input;
   time-stamping, by the user device, a receipt of the subsequent trick play input in response to determining that the subsequent trick play input include the one of the play input or the resume input; and
   selecting, by the user device, one of the predictive positions based on a timestamp value associated with the receipt of the subsequent trick play input.

2. The method of claim 1, further comprising:
   jumping to the one of the predictive positions during an execution of the subsequent trick play input.

3. The method of claim 1, wherein the continuously calculating comprises:
   calculating a predictive position based on the time period, a difference in streaming program progress that occurs during the time period, a type of the trick play input, and a speed associated with the trick play input.

4. The method of claim 1, further comprising:
   continuously calculating predictive positions for the streaming program that correspond to predicted receipts of another subsequent trick play input in response to determining that the subsequent trick play input does not include the one of the play input or the resume input.

5. The method of claim 1, further comprising:
   storing a default request delay value that indicates a delay period that transpires from an instant in time when a trick play input is received to an instant in time proximate to an execution of the trick play input.

6. The method of claim 5, further comprising:
   comparing the request delay value to the default request delay value;
   determining whether the request delay value is within a pre-assigned variance of the default request delay value; and
   updating the default request delay value with the request delay value when the request delay value is outside of the pre-assigned variance, wherein the pre-assigned variance is a percentage of the default request delay value.

7. A device comprising:
   a communication interface;
   a memory to store instructions; and
   a processor to execute the instructions to:
      receive, via the communication interface, a streaming program from another device;
      receive a trick play input during a streaming of the streaming program, wherein the trick play input includes one of a fast-forward input, a rewind input, or a pause input;
      time-stamp a receipt of the trick play input;
      measure a time period that transpires from the receipt of the trick play input to an instant in time proximate to an onset of executing the trick play input;
      generate a request delay value indicative of the time period based on a measurement of the time period;
      execute the trick play input;
      continuously calculate predictive positions for the streaming program that correspond to predicted receipts of a subsequent trick play input;
      receive the subsequent trick play input;
      determine whether the subsequent trick play input includes one of a play input or resume input;
      time-stamp a receipt of the subsequent trick play input in response to a determination that the subsequent trick play input include the one of the play input or the resume input; and
      select one of the predictive positions based on a timestamp value associated with the receipt of the subsequent trick play input.

8. The device of claim 7, wherein the processor to execute the instructions to:
   jump to the one of the predictive positions during an execution of the subsequent trick play input.

9. The device of claim 7, wherein the processor to execute the instructions to:
   calculate a predictive position based on the time period, a difference in streaming program progress that occurs during the time period, a type of the trick play input, and a speed associated with the trick play input.

10. The device of claim 7, wherein the processor to execute the instructions to:
    continuously calculate predictive positions for the streaming program that correspond to predicted receipts of another subsequent trick play input in response to a determination that the subsequent trick play input does not include the one of the play input or the resume input.

11. The device of claim 7, wherein the processor to execute the instructions to:

store a default request delay value that indicates a delay period that transpires from an instant in time when a trick play input is received to an instant in time proximate to an execution of the trick play input.

12. The device of claim 7, wherein the processor to execute the instructions to:
compare the request delay value to the default request delay value;
determine whether the request delay value is within a pre-assigned variance of the default request delay value; and
update the default request delay value with the request delay value when the request delay value is outside of the pre-assigned variance, wherein the pre-assigned variance is a percentage of the default request delay value.

13. A non-transitory storage medium storing instructions executable by a computational device, wherein the instructions comprise instructions to:
play a streaming program;
receive a trick play input during the playing of the streaming program, wherein the trick play input includes one of a fast-forward input, a rewind input, or a pause input;
time-stamp a receipt of the trick play input;
measure a time period that transpires from the receipt of the trick play input to an instant in time proximate to an onset of executing the trick play input;
generate a request delay value indicative of the time period based on a measurement of the time period;
execute the trick play input;
continuously calculate predictive positions for the streaming program that correspond to predicted receipts of a subsequent trick play input;
receive the subsequent trick play input;
determine whether the subsequent trick play input includes one of a play input or resume input;
time-stamp a receipt of the subsequent trick play input in response to a determination that the subsequent trick play input include the one of the play input or the resume input; and
select one of the predictive positions based on a timestamp value associated with the receipt of the subsequent trick play input.

14. The non-transitory storage medium of claim 13, further comprising instructions to:
calculate a predictive position based on the time period, a difference in streaming program progress that occurs during the time period, a type of the trick play input, and a speed associated with the trick play input.

15. The non-transitory storage medium of claim 13, further comprising instructions to:
continuously calculate predictive positions for the streaming program that correspond to predicted receipts of another subsequent trick play input in response to a determination that the subsequent trick play input does not include the one of the play input or the resume input.

16. The non-transitory storage medium of claim 13, further comprising instructions to:
compare the request delay value to the default request delay value;
determine whether the request delay value is within a pre-assigned variance of the default request delay value; and
update the default request delay value with the request delay value when the request delay value is outside of the pre-assigned variance, wherein the pre-assigned variance is a percentage of the default request delay value.

17. A method comprising:
receiving, by a user device, a streaming program from another device;
receiving, by the user device, a trick play input during the receiving of the streaming program, wherein the trick play input includes one of a fast-forward input, a rewind input, or a pause input;
time-stamping, by the user device, a receipt of the trick play input;
transmitting, by the user device and to the other device, a trick play input request that includes a timestamp indicative of when the receipt occurs; and
receiving, by the user device, the streaming program at a predictive position, in response to the transmitting, wherein the predictive position is an instant in time that the streaming program would have been if a request delay period had not transpired, wherein the request delay period is from an instant in time when the receipt of the trick play input occurred to an instant in time proximate to an execution of the trick play input, by the other device.

18. The method of claim 17, further comprising:
measuring, by the other device, the request delay period based on the trick play input request that includes the timestamp;
generating, by the other device, a request delay value indicative of the time period based on the measuring; and
executing, by the other device, the trick play input.

19. The method of claim 18, further comprising:
calculating, by the other device, the predictive position based on the request delay value, a difference in streaming program progress that occurs during the request delay period, a type of the trick play input, and a speed associated with the trick play input.

20. The method of claim 19, further comprising:
storing a default request delay value that indicates a delay period that transpires from an instant in time when a trick play input is received to an instant in time proximate to an execution of a trick play input.

21. The method of claim 20, further comprising:
comparing the request delay value to the default request delay value;
determine whether the request delay value is within a pre-assigned variance of the default request delay value; and
update the default request delay value with the request delay value when the request delay value is outside of the pre-assigned variance, wherein the pre-assigned variance is a percentage of the default request delay value.

22. A system comprising:
a user device comprising:
a communication interface;
a memory to store instructions; and
a processor to execute the instructions to:
receive, via the communication interface, a streaming program from another device;
receive a trick play input during a receipt of the streaming program, wherein the trick play input includes one of a fast-forward input, a rewind input, or a pause input, during a streaming of the streaming program;
time-stamp a receipt of the trick play input;
transmit, via the communication interface and to the other device, a trick play input request that includes a timestamp indicative of when the receipt occurs; and
receive, via the communication interface and from the other device, the streaming program at a predictive position, wherein the predictive position is an instant in time that the streaming program would have been if a request delay period had not transpired, wherein the request delay period is from an instant in time when the receipt of the trick play input occurred to an instant in time proximate to an execution of the trick play input, by the other device.

23. The system of claim 22, further comprising the other device comprising:
   a communication interface;
   a memory to store instructions; and
   a processor to execute the instructions to:
      measure the request delay period based on the trick play input request that includes the timestamp;
      generate a request delay value indicative of the time period based on a measurement of the request delay period; and
      execute the trick play input.

24. The system of claim 23, wherein the processor of the other device is to execute the instruction to:
   calculate the predictive position based on the request delay value, a difference in streaming program progress that occurs during the request delay period, a type of the trick play input, and a speed associated with the trick play input.

25. The system of claim 24, wherein the other device comprises a storage device that stores a default request delay value that indicates a delay period that transpires from an instant in time when a trick play input is received to an instant in time proximate to an execution of a trick play input.

\* \* \* \* \*